United States Patent [19]

Bähr

[11] 4,059,527

[45] Nov. 22, 1977

[54] PRETREATMENT FILTER PRESS DEWATERING SYSTEM

[76] Inventor: Albert Bähr, Parallelstrasse 2A, D-6683 Elversberg, Saar, Germany

[21] Appl. No.: 632,691

[22] Filed: Nov. 17, 1975

[30] Foreign Application Priority Data

June 4, 1975 Germany .............................. 2524851

[51] Int. Cl.² ............................................. B01D 33/02
[52] U.S. Cl. .................................... 210/259; 210/386; 210/400; 210/526
[58] Field of Search ..................... 210/73 A, 73 S, 77, 210/324, 330, 335, 400, 386, 526, 259; 100/138, 139, 123, 124

[56] References Cited

U.S. PATENT DOCUMENTS

| | | | |
|---|---|---|---|
| 2,907,447 | 10/1959 | Offutt et al. ....................... | 100/138 X |
| 3,230,866 | 1/1966 | Branders et al. .................. | 100/138 X |
| 3,458,046 | 7/1969 | Passavant ......................... | 210/330 X |
| 3,595,400 | 7/1971 | Peterson .......................... | 210/330 X |
| 3,615,011 | 10/1971 | Eakins .............................. | 210/77 |

*Primary Examiner*—Theodore A. Granger
*Attorney, Agent, or Firm*—Stevens, Davis, Miller & Mosher

[57] ABSTRACT

An improved water removal in a filter press used in sludge treatment processes, typically in a sewage plant, is provided through the addition of a pretreatment stage where water is removed to an appreciable extent. The filter press pretreatment system is based upon continuously circulating filter pockets into which flocculant-treated sludge has been added, a significant amount of the water from the thus clarified sludge being removed through the combination of the use of this pretreatment and in this pretreatment using filter pockets of variable volume.

8 Claims, 11 Drawing Figures

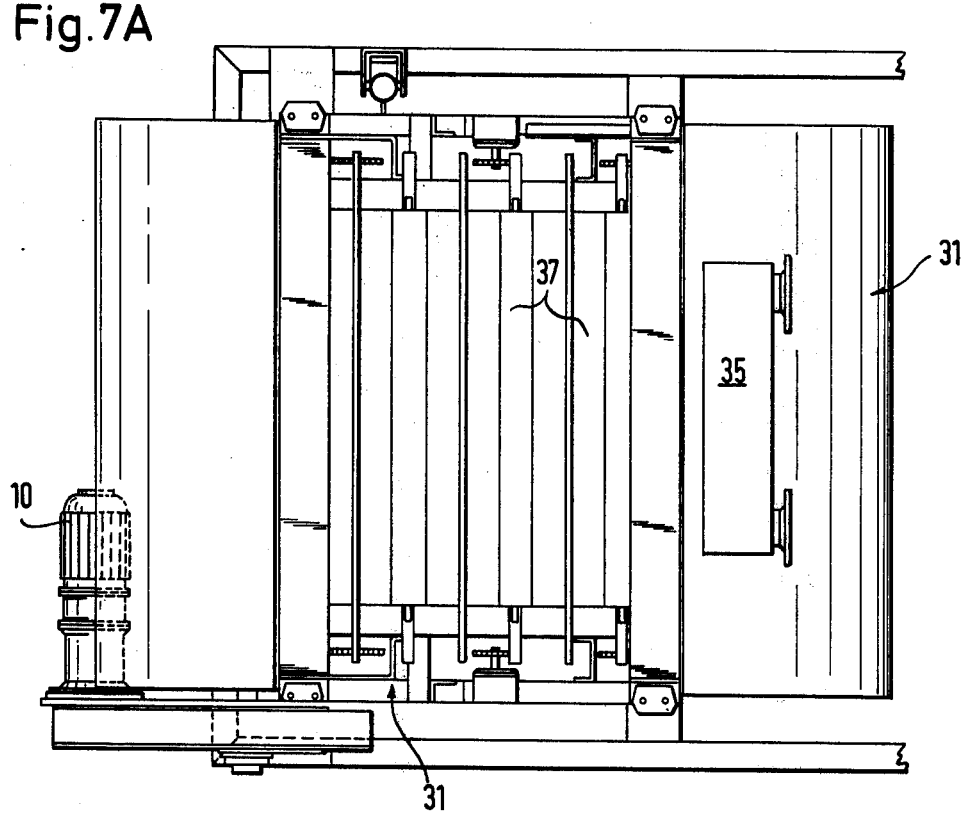

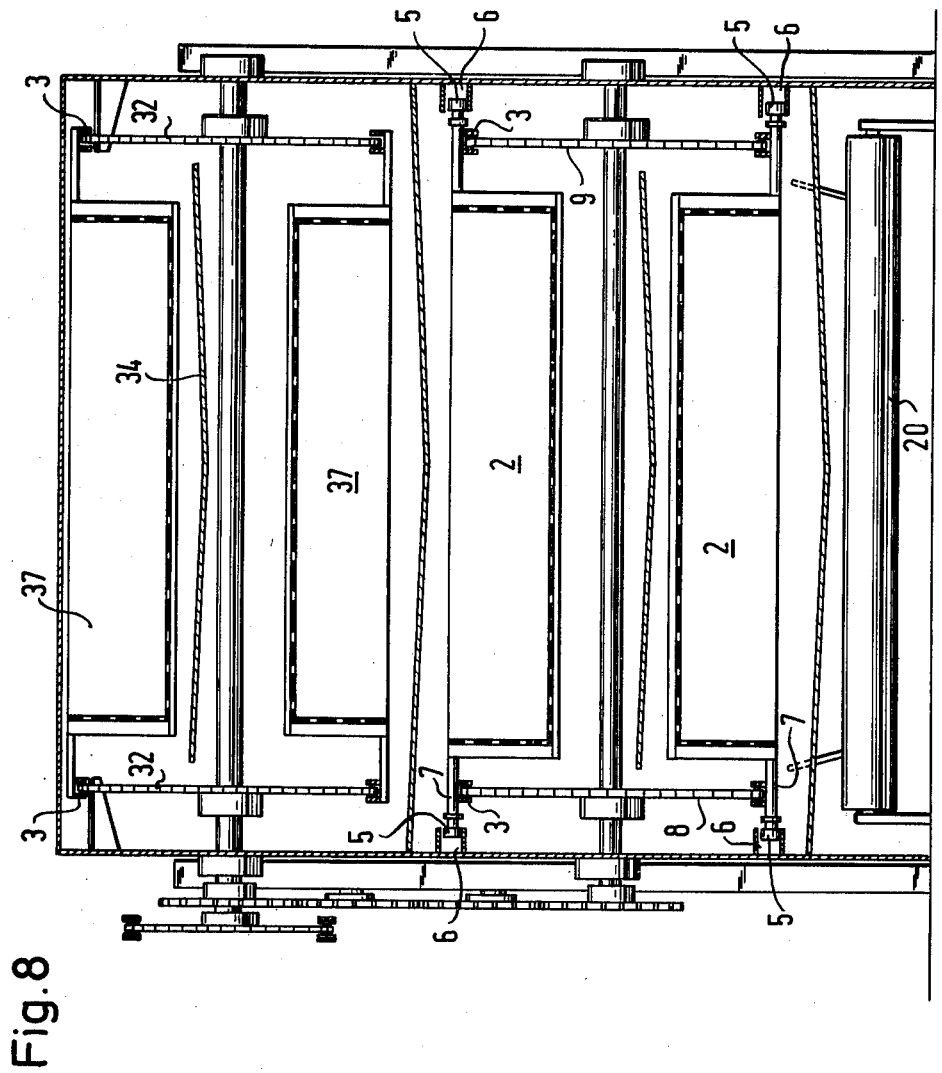

PRETREATMENT FILTER PRESS DEWATERING SYSTEM

BACKGROUND OF THE INVENTION

With the ever increasing awareness of pollution problems in contemporary society, and with the ever increasing volume of waste products which forms a natural byproduct of growth in the industrialized world, there have been ever increasing demands placed upon the requirements of new sewage treatment plants, and also demands for improvement of existing systems. In my patents U.S. Pat. Nos. 3,743,100, dated July 3, 1973, entitled FILTER PRESS, MORE PARTICULARLY FOR DEWATERING SLUDGE IN SEWAGE TREATMENT PLANTS, and 3,896,030, dated July 32, 1975, entitled identically to the first mentioned patent, I have described certain filter press systems to be advantageously used for the facilitation of sludge. In the latter patent, 030, I have also discussed a dewatering system which has been based on the principle of simply straining sludge through the action of gravity. It was pointed out in the 030 patent that various known filter presses possess a preliminary dewatering section, which is essentially a straining system, while in other cases the material on the filter belt is first squeezed between pressure rollers, prior to treatment on a rotary drum system. The filter press dewatering means described in this prior art in the 030 patent have the disadvantage that filtering efficiency is comparatively low, the contruction relatively complex, and the space occupied by the machine is relatively great. In my 030 patent there is described a new dewatering means which has a pretreatment system, whereby the sludge, prior to reaching the rotary belt is pressed between two filter belts, with a filter belt acting as a strainer. Thus, through the action of gravity an appreciable amount of the water is removed, thus reducing the total water content of the sludge prior to entering the rotary drum system. In my copending patent application, Bahr, U.S. Ser. No. 632,789, entitled SLUDGE PRETREATMENT DEWATERING BASED UPON A CONTINUOUS SYSTEM OF FILTER POCKETS, filed on even date herewith, there is described an advantageous method for partially dewatering sludge prior to treatment of the sludge in a conventional filter press. This system in part serves to improve existing sludge treatment systems, and this system of said copending patent application may be incorporated into the method and apparatus of a second copending patent application, Bahr, U.S. Ser. No. 632,689 entitled CONSECUTIVE, INDEPENDENT DEWATERING APPARATUS AND METHOD FOR IMPROVED SLUDGE TREATMENT, filed on even date herewith.

SUMMARY OF THE INVENTION

The present invention is an improvement upon the invention which is disclosed in my copending application U.S. Ser. No. 632,789, entitled SLUDGE PRETREATMENT DEWATERING BASED UPON A CONTINUOUS SYSTEM OF FILTER POCKETS, filed on even date herewith, hereinafter referred to as the First Case. Essentially, the improvement which comprises the present invention refines the use of the filter pockets of the First Case by providing for a variable volume of the filter pockets during the cycle.

Accordingly, the present invention provides an apparatus for the removal of an appreciable amount of water from an aqueous mixture having an appreciable solids content, which comprises a system of continuous filter pockets, said filter pockets being positioned to travel in a continuous pattern whereby at one position said aqueous mixture enters into individual filter pockets, the sludge being partially drained off and then the sludge being dumped out as the filter pockets go through the cycle, wherein the instant improvement over the First Case provides that the volume of the filter pockets is variable during the cycle.

BRIEF DESCRIPTION OF THE DRAWINGS

For a more complete understanding of the invention reference is made to the attached drawings wherein:

FIG. 7A is a top view of FIG. 7;

FIG. 8 is a sectional view along the line VIII—VIII of FIG. 7 to an enlarged scale.

DETAILED DESCRIPTION OF THE INVENTION

Figure 1:
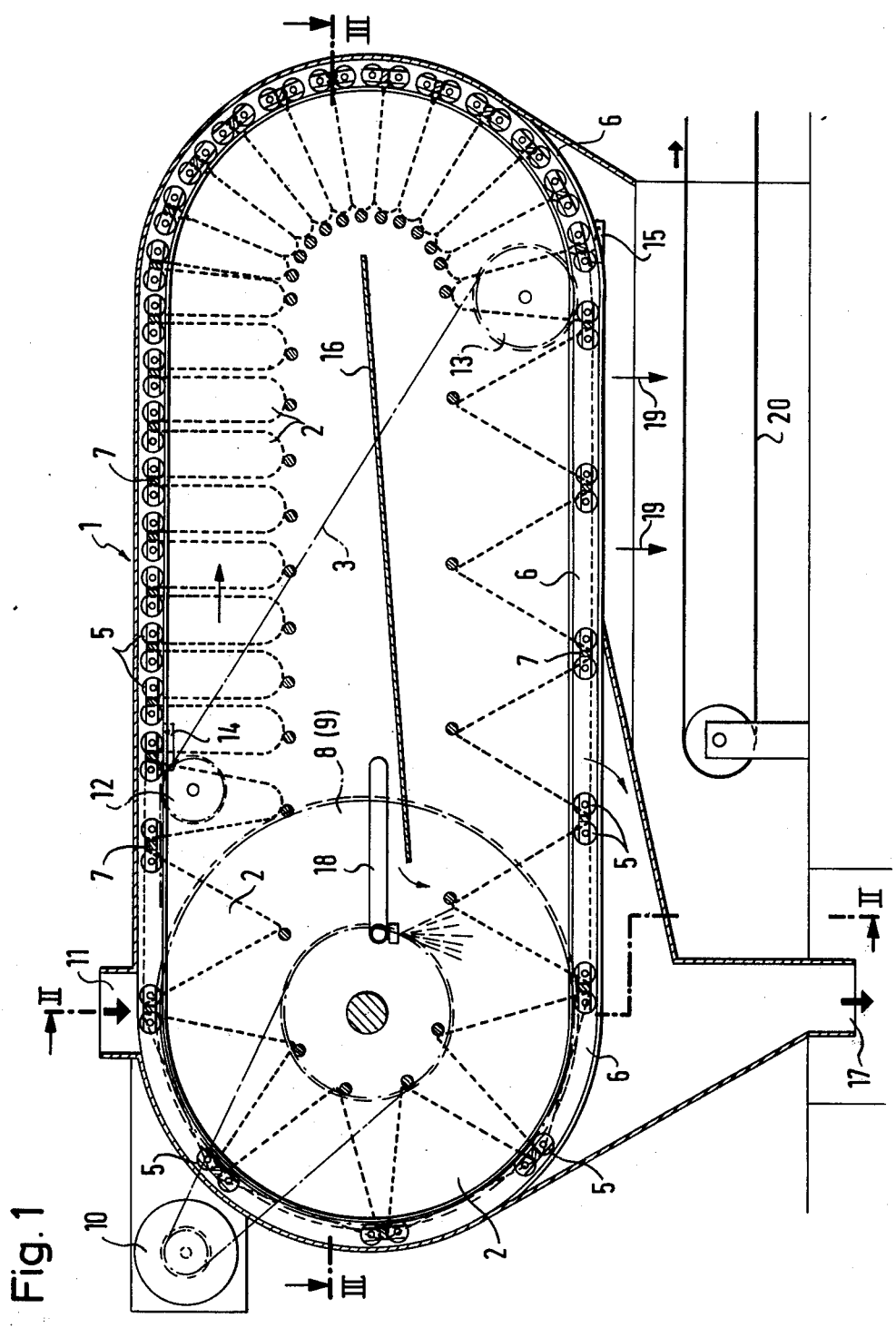
FIG. 1 is a sectional side view of apparatus according to the invention.

The present invention relates to an improvement in the aforesaid First Case, the drawings of which and supporting disclosure in the specification hereby being incorporated into the present specification by reference. Through the present invention an economy of space is realized by utilizing the volumetric change which results when the liquid is discharged through the filter pockets. This is accomplished in accordance with the present invention by constructing the filter pockets to have a variable volume. While sludge or the like is drained in the filter pockets while passing through the drainage apparatus, in accordance with the present invention it is proposed that the space which is occupied by the filter pocket in the conveying path of the filter pockets of the continuous path of filter pockets during the draining operation is reduced in accordance with the volumetric reduction and the time available for drainage in a conveying section is prolonged.

In apparatus according to the invention this achieves the advantage, more particularly in the above-described and like manner that, given the same amount of space a comparatively high dry substance content of the order of approximately 20% can be achieved because of the increase in time made available for drainage by the invention but without causing the apparatus to occupy an excessive amount of space.

More particularly, in a further embodiment of the invention the filter pockets can be constructed so that during circulation they are compressible in the circulating direction.

In a preferred embodiment of the invention which also represents a further embodiment of the proposal disclosed, the compressible filter pockets are disposed in an endless circulating conveyor. To this end the apparatus is appropriately constructed so that the filter pockets can be coupled to the circulating conveyor by means of detachable couplings. In this way it is possible to uncouple the filter pockets from the circulating conveyor over part of the circulating path of the filter pockets and to provide said filter pockets with free movability in this section of the circulating path for the purpose of achieving compressibility.

In all cases the apparatus according to the invention is constructed in such a way that the circulating filter pockets are supported so as to circulate freely in a circulating path in such a way that they can be temporarily coupled to the driving means of the conveyor.

In the apparatus according to the invention the filter pockets are appropriately guided in the circulating path through a filling station for charging material for drainage and through a delivery station for discharging drained material.

More particularly, it is advantageous to construct the apparatus according to the invention in such a way that between their delivery station and their charging station the filter pockets are connected in the circulating path in by means of couplings to the drive and the said circulating path is provided with one or more means for producing build-up in the circulating path upstream of the delivery station so as to reduce the width of the filter pocket. To this end, one or more locking means which can be triggered by the filter pockets can be disposed in the circulating path thereof.

In one embodiment of the invention which is particularly appropriate for the requirements of practical operation, the filter pockets are driven by drivers the distance between which corresponds to the maximum width of the filter pockets. To this end the drivers are advantageously disposed on one or more driven chains and the circulating path of the chains is appropriately constructed so that the drivers release the appropriate filter pocket behind the locking means which form the beginning of the build-up section and again entrain the pockets behind the locking means representing the end of the build-up section. Furthermore, the locking means are appropriately constructed so that they are automatically triggered by the filter pockets.

Advantageously, the trigger points of the two locking means can arranged and dimensioned in such a way that the entry of a filter pocket into the build-up section thrusts another pocket out of the end of the build-up section.

The locking means can be advantageously constructed as spring-biased or weight-biased locking pawls and can have sloping surfaces over which the filter pockets traverse during circulation, thus unlatching the locking means.

Advantageously, the filter pockets are suspended and arranged in the apparatus so that said filter pockets are supported on both sides on roller pairs which run in guides, each of the leading roller pairs being independent of each of the trailing roller pairs so that the filter pocket can be compressed by the roller pairs approaching each other. To this end, a separate roller pair is advantageously provided for the common leading or trailing edge of two successive filter pockets.

Finally, the filter pocket bearings are provided with support means for the bottom of the said pockets, the said support means acting, for example from the outside, on the appropriate filter pocket. In all cases it will be advantageous to construct the support means and retaining means for the top edges of the filter pockets in the form of girders which extend over the entire width of the filter pockets. The said girders also advantageously constitute the stop abutments for the drivers which are disposed on the conveying chains.

The filter pockets 2 are supported on both sides on rollers 5 which can run freely in a guide 6. Advantageously, two adjacent rollers which prevent tilting of the girder 7 which retains the appropriate edge of the filter pockets 2 are provided at each bearing point of the filter pockets 2. Advantageously, the guides 6 comprise the channel girders which are mounted on the side walls of the casing and are adapted to receive the roller 5.

The roller pairs which support the filter pockets 2 are basically freely slidable in the guides 6 and can move towards or away from each other for the purpose of opening or closing a filter pocket 2.

Figure 3:
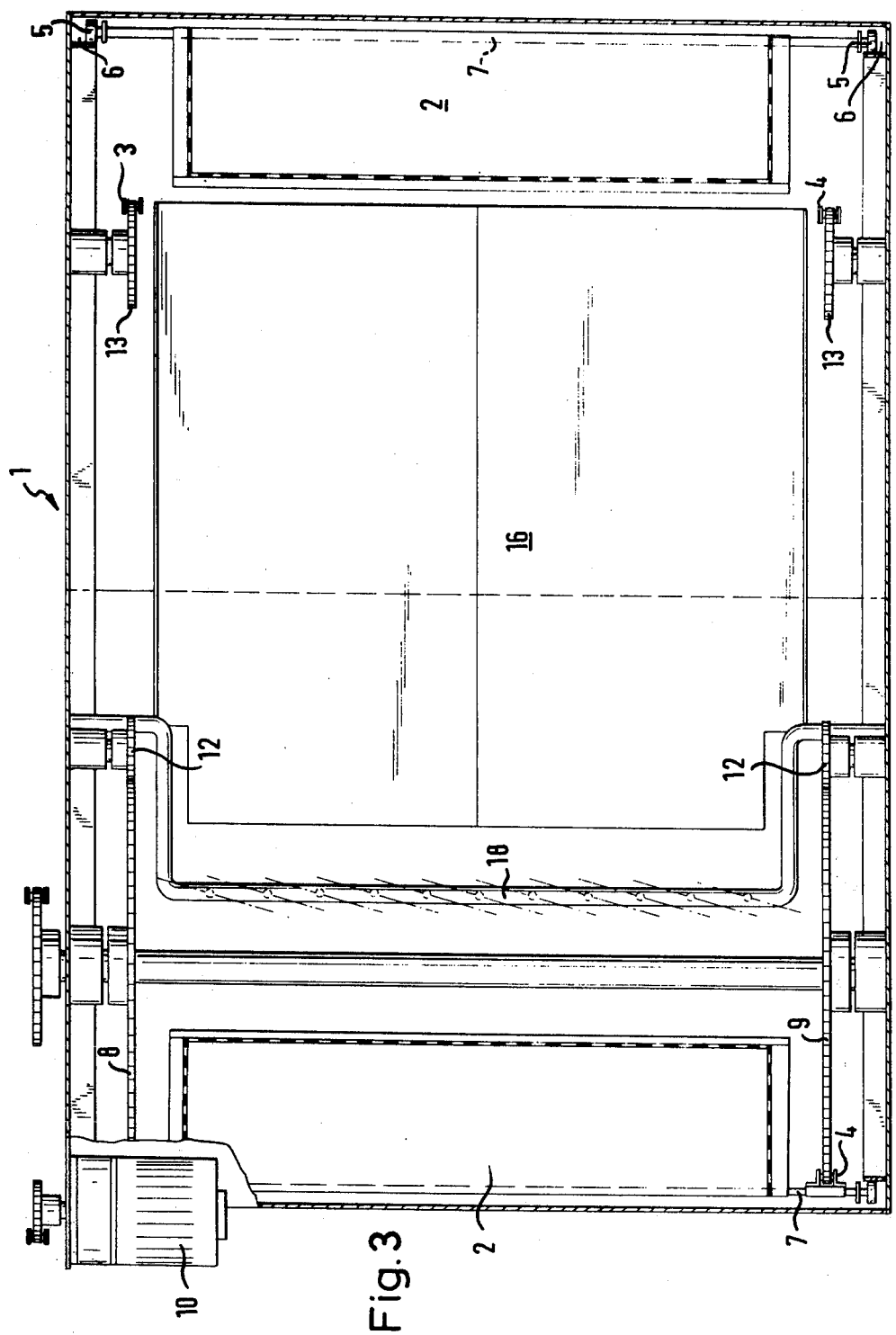
FIG. 3 is a sectional view along the line III—III of FIG. 1 to an enlarged scale.

The kind of drive illustrated in FIGS. 1 and 3 is provided because in accordance with the invention it is desired to obtain a special kind of motion of the roller pairs in order to achieve the above-mentioned reduction of the space occupied thereby. Filter pockets 2 are driven by lateral chains 3 which are not fixedly joined in any manner to the filter pockets but are provided with the drives described hereinbelow and which engage with the filter pockets 2 over only part of the conveying distance.

To this end, the chains 3 are guided over chain sprockets 8, 9 on one end of the drainage apparatus 1, said sprockets driving the chains 3. The chain sprockets 8, 9 receive their drive from the motor 10 via an interposed transmission.

Proceeding from the chain sprockets 8, 9, the chains 3 are initially horizontally guided in the region of the sludge feed 11, then pass via reversing pulleys 12 downwardly at an angle over further reversing pulleys 13 which again move the drivers disposed on the chains into the region of the filter pockets. The chains extend from the reversing pulleys 13 in the horizontal conveying section to the chain sprockets 8, 9.

Locking means which will be described subsequently and which define the region or section of the conveying path in which the filter pockets 2 are not provided with a direct drive are situated at places 14 and 15 of the circulating path for the filter pockets 2.

The numeral 16 refers to a filtrate collecting plate, the numeral 17 to discharge means for the filtrate and the numeral 18 to a washing device.

The illustrated drainage apparatus generally operates in such a way that the material for drainage is charged through the inlet 11 on to the filter pocket belt into the filter pockets 2 and is then moved around the circulating path of the guides 6 by means of chains through couplings, to be described subsequently, and disposed on chains and usually taking the form of drivers. As may be seen by reference to the drawing, the filter pockets are in the fully opened state at the charging station and in the course of their circulation are compressed so that the interior space of the filter pockets is reduced in accordance with the quantity of filtrate which is discharged from the pockets. The filtrate discharged from the filter pockets is collected by the collecting plate 16 and is discharged at 17. The filter pockets are compressed by building up the filter pockets in a build-up section, as may be seen in the right-hand half of FIG. 1. The re-opened filter pockets 2 discharge the drained material downwardly at 19 in the bottom circulating stringer, such material being then taken up by a conveyor belt 20.

Figure 4:
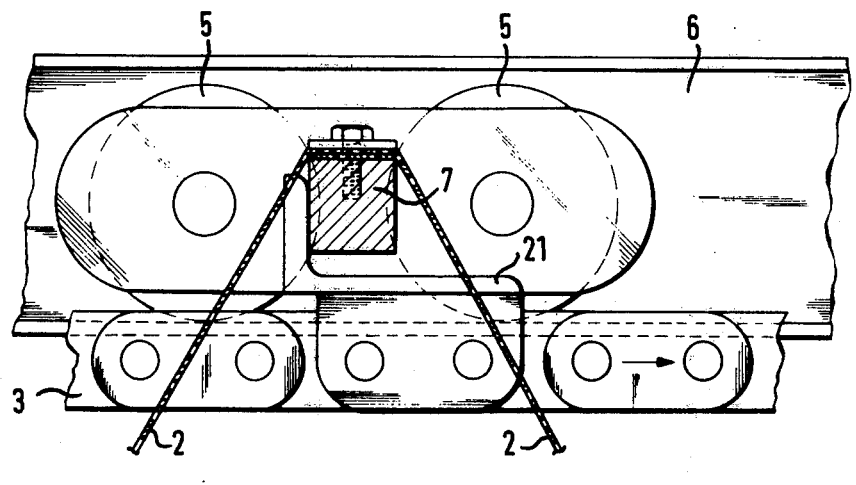
FIG. 4 shows a detail of the driver transmission for the filter pockets of the pre-draining apparatus to an enlarged scale.

FIG. 4 shows one detail of the drive for the filter pockets. As can be seen, the filter pockets 2 move in the guide 6, comprising the channel section, by means of rollers 5 which support cross-members 7. The cross-members 7 are disposed on the outside of the filter pockets 2, this construction having the advantage of preventing fibre material which may be contained in the sludge from lodging on said cross-members. As shown in FIG. 4, each of the drivers 21 are mounted on a link of the chains 3 and grip behind the cross-member 7 so that the rollers 5 are moved in the guide 6 and therefore the filter pockets 2 are moved to the right when the chains 3 move to the right as seen in the illustration of FIG. 4.

The drivers 21 are mounted at equal distances from each other in pairs and in opposite configuration on the chains 3, 4, the distance between two successive drivers 21 on one of the chains 3, 4 corresponding to the maximum possible opening of the filter pockets 2.

Figure 5:
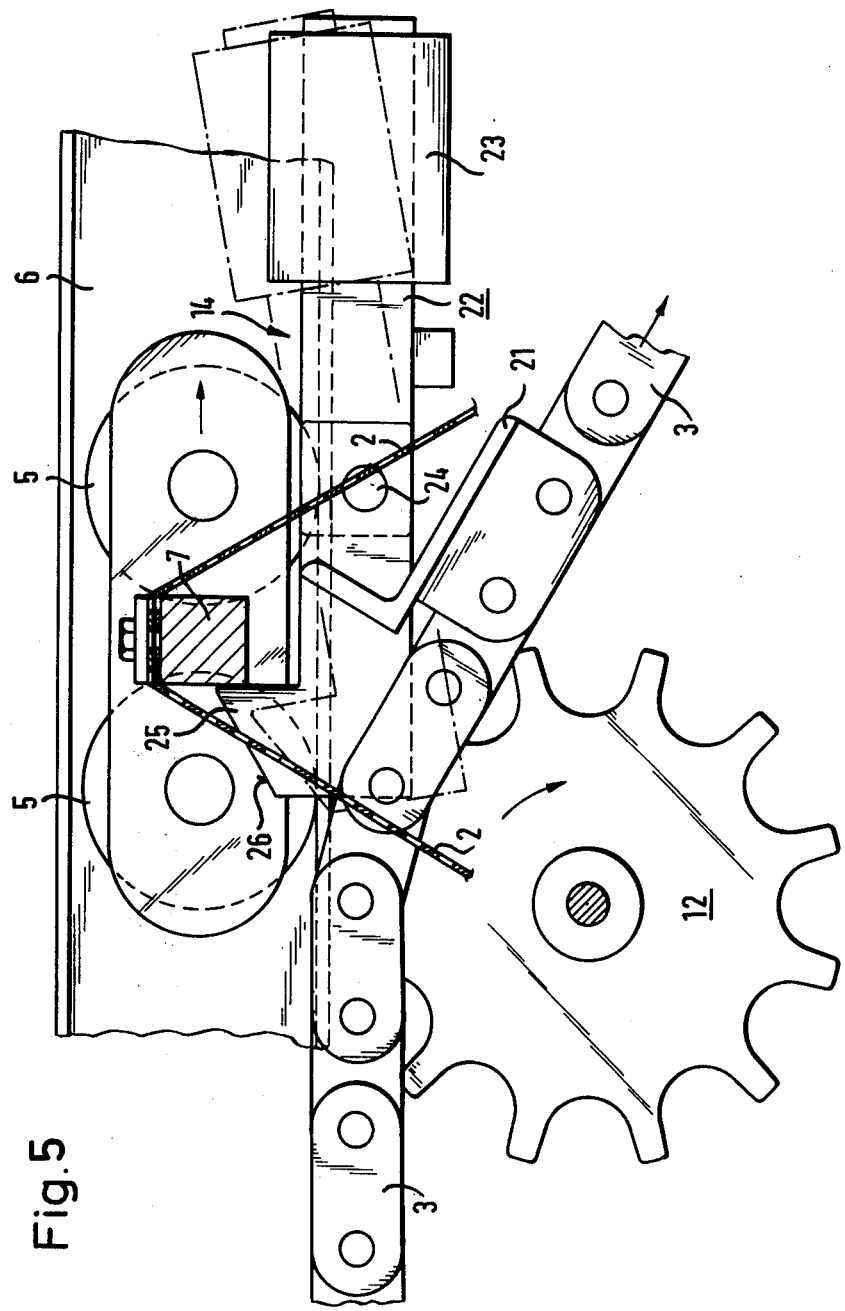
FIG. 5 shows to an enlarged scale the detail according to FIG. 4 in another operating position on entry into the locking means which form the beginning of the build up section.
Figure 6:
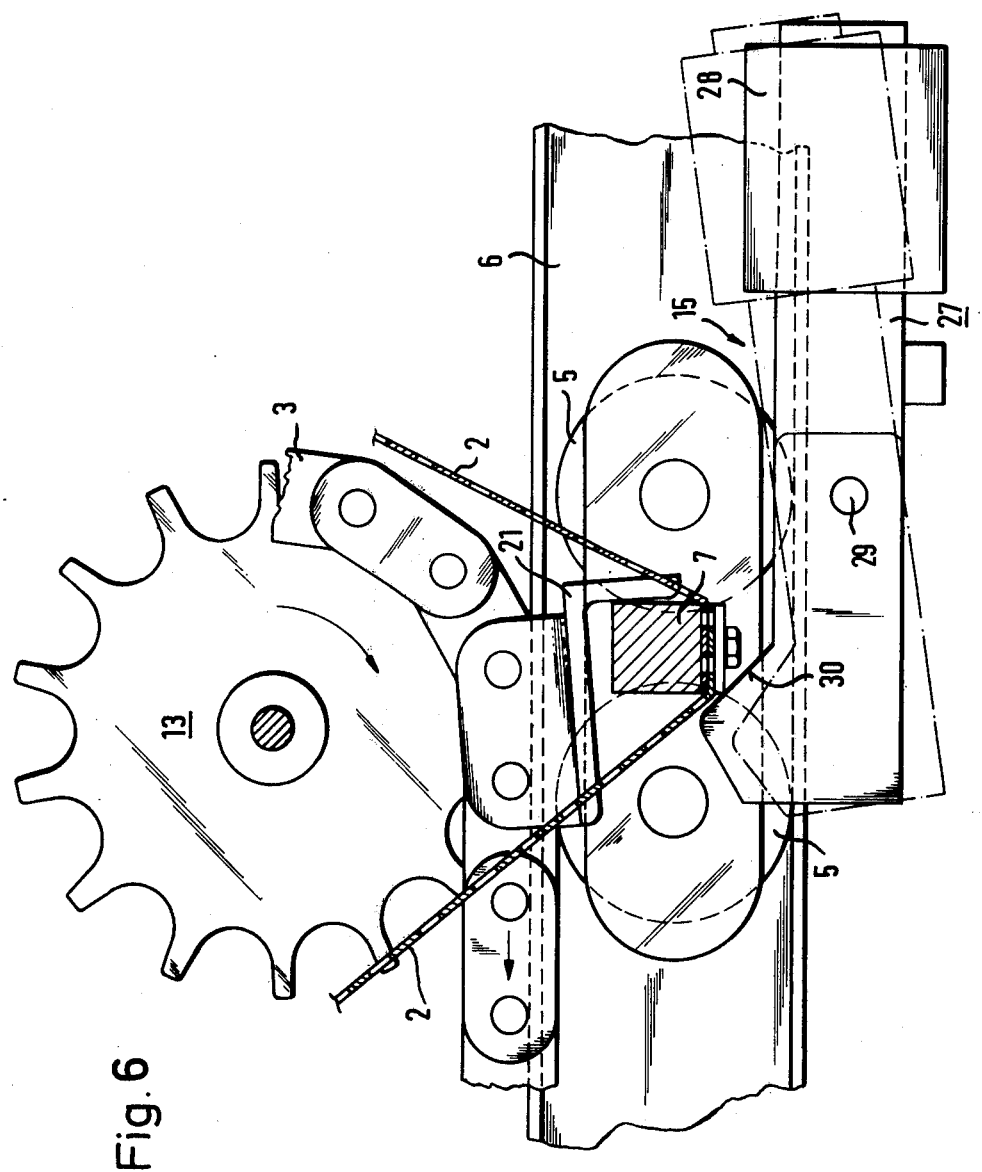
FIG. 6 shows an enlarged scale of the locking means at the end of the build-up section, one filter pocket being in the process of being entrained therefrom.

FIGS. 5 and 6 show details of the locking means 15 and 14 which define the non-driven region of the conveying path of the filter pockets 2, the top locking means 14 being illustrated in FIG. 5 and the bottom locking means 15 being illustrated in FIG. 6. Each locking means 14 or 15 is provided in the region of the corresponding chains 3, 4.

In the preferred embodiment, the locking means according to FIG. 5, disposed directly behind each reversing pulley 12 and behind which the main draining section of the draining apparatus begins, comprises a locking pawl, referenced in its entirety with the numeral 22, said locking pawl being loaded by an adjustable weight and being pivotable about a pivoting point 24. The hook extension 25 which represents the actual locking means and is situated in front of the pivoting point 24 is provided with a frontal sloping surface 26 over which the rollers 5 can traverse which thus pivot the pawl 22 downwardly, as illustrated in the dash-dot lines. After the rollers have traversed over the sloping surface 26 the locking pawl 22 again pivots upwardly under the action of the weight 23 and thus grips behind the cross-members 7 of the filter pockets 2 so that these are retained against moving in the opposite conveying direction.

The filter pocket which is located on the right-hand side in each case in the drawing of FIG. 5 is thrust to the right on the compressed build-up of filter pockets 2 in front of the drivers 21 which act as coupling between the chains 3, 4 and the filter pockets 2 so that the volume of the said right-hand filter pocket is reduced and the appropriate driver 21 releases the engagement with the cross-member 7 of the filter pockets when passing around the reversing pulleys 8,9 while the cross-member 7 is simultaneously retained by the locking pawl 25 so that the compressed and built-up filter pockets cannot run back in the guide 6 when driving engagement of the appropriate driver 28 ceases because of the downward motion of the chains on the reversing pulleys 8, 9.

The appropriate filter pocket is released by downward thrust of the locking pawl at the place shown in FIG. 6 in the bottom stringer of the circulating filter pockets 6, thus restoring coupling between the chains 3 and the appropriate filter pockets 2 by the action of the drivers 21 on the cross-member 7 of the appropriate filter pocket, such coupling having been released over the course of the build-up section of the filter pockets.

In a modified embodiment according to the invention each locking pawl 22 or 27 is provided approximately in the middle of a cross-member 7 and is thus directly actuated thereby.

Figure 2:
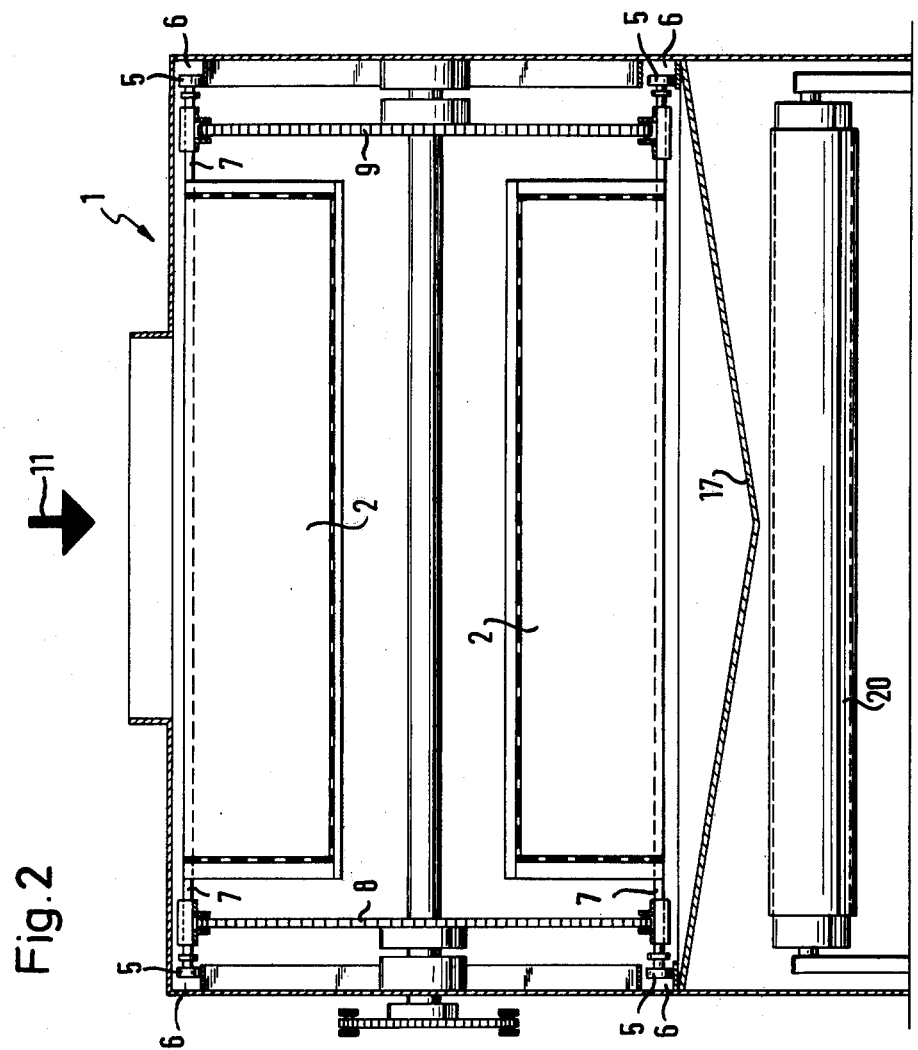
FIG. 2 is a sectional view along the line II—II of FIG. 1 to an enlarged scale.
Figure 7:
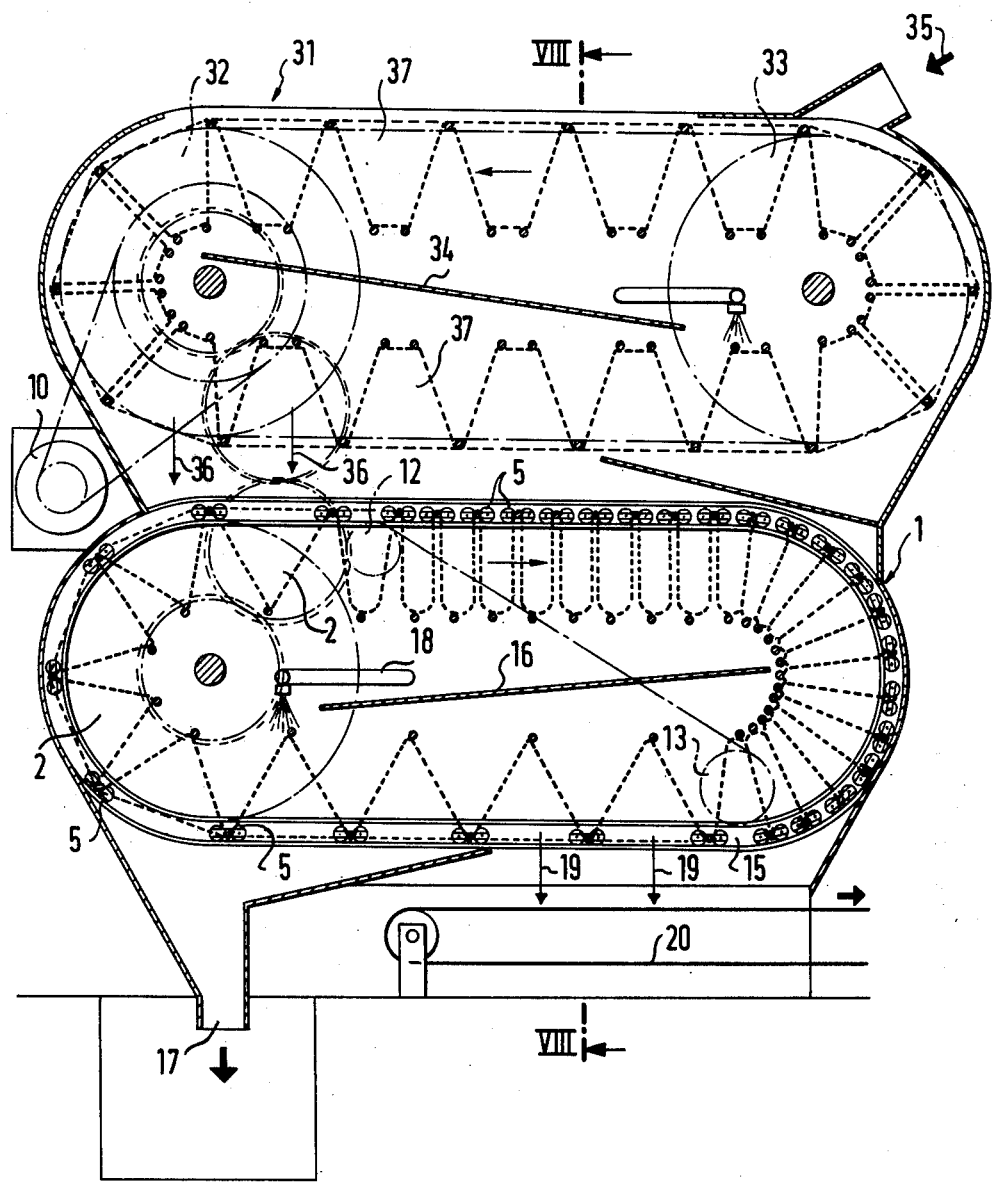
FIG. 7 is a diagrammatic sectional side view of a two stage pre-draining system.
Figure 7B:
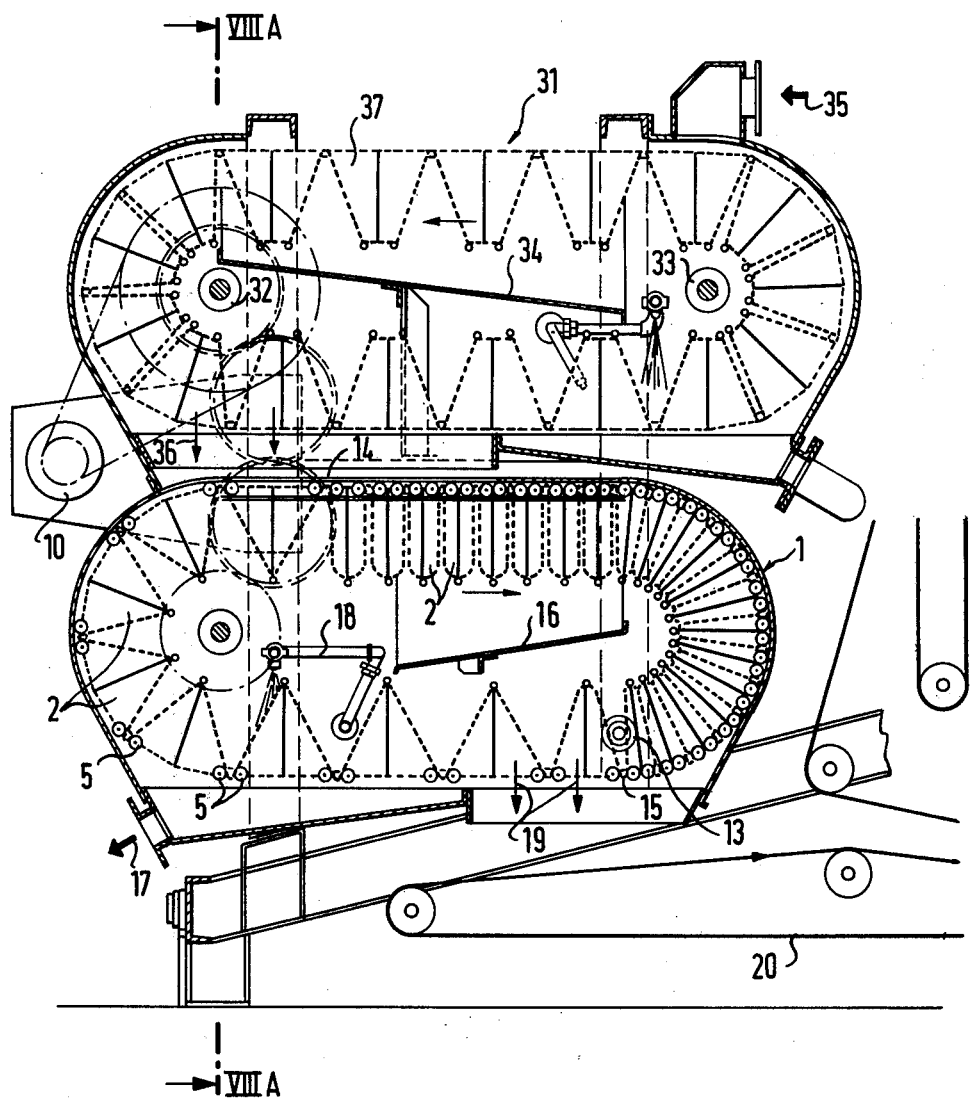
FIG. 7B is a more detailed view of FIG. 7.
Figure 8A:
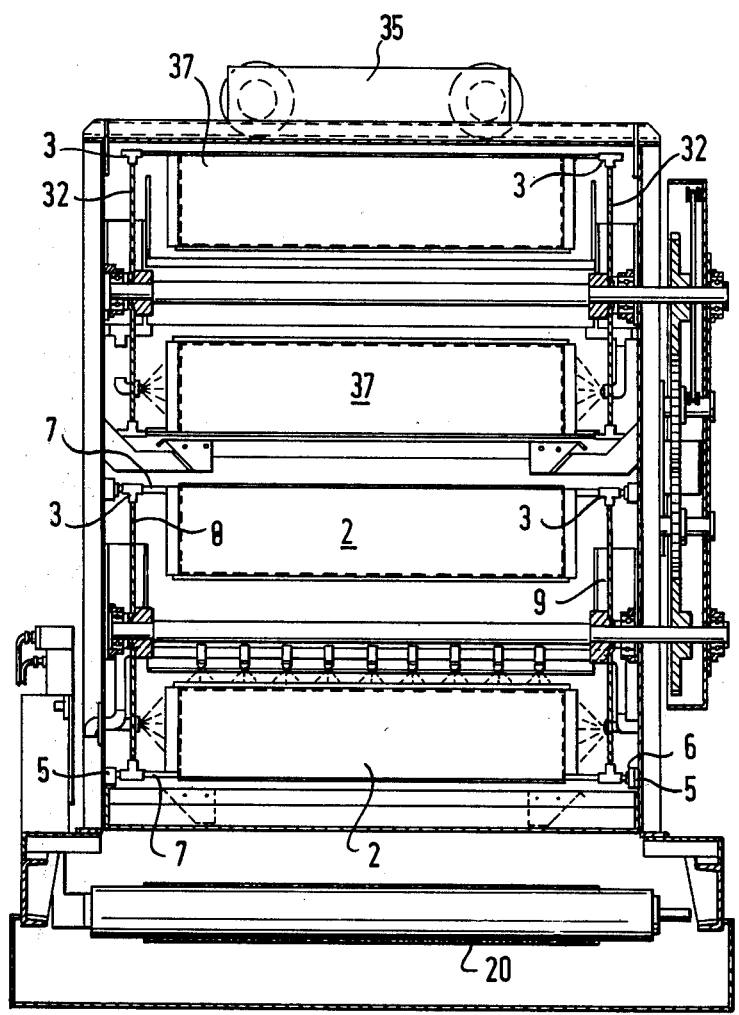
FIG. 8A is a sectional view of FIG. 7B along the line VIIIA—VIIIA.

FIGS. 7 and 8 illustrate one embodiment of the invention in which the drainage system according to FIGS. 1 to 6 is preceded by a pre-drainage system, constructed substantially in accordance with FIG. 2 of the Parent Patent. The pre-drainage system referenced in its entirety by the numeral 31 is also provided with circulating chains on which filter pockets are secured by means of rods and cross-members, the filter pockets and the mounting thereof being constructed so that the cross-section of the filter pockets is trapezoidal. This shape is particularly advantageous because an additional filter surface is formed at the bottom of each filter pocket. The chain links of the circulating chains in this case are preferably provided with rollers on both sides which are adapted to move on the section disposed between the chain sprockets 32 and 33 in the top as well as in the bottom stringer on guides. A collecting plate 34 disposed below the top stringer of the filter pockets is provided for delivering the filtrate which is discharged from the filter pockets. The motor 10 drives the chain sprocket 32. A belt pocket filter of the kind described by reference to FIGS. 1 to 6 is provided below the pre-drainage belt pocket filter.

The system illustrated in FIGS. 7 and 8 operates as follows:

The sludge, mixed with flocculating media at 35, is charged into the filter pockets 37 of a first unpressurized pre-drainage system 31. In the view according to FIG. 7, these filter pockets, whose size and spacing remains constant, move to the left over the horizontal drainage section and discharge a large quantity of the water contained therein as filtrate which is collected via the plate 34 and is discharged. After rotation of the chain sprocket 33 the contents of the filter pockets 37 are transferred at 36 to the filter pockets 2 of the drainage system 1. The rollers 5 or the transverse member 7 of the filter pockets 2 engage with the drivers 21 of the chains 3 at this location of the conveying path of the drainage system 1. Since the distance between the drivers 21 correponds to the maximum opening width of the filter pockets 2, the latter will be wide open at the transfer location 36, the distance between roller pairs corresponding appropriately to the fixed pitch of the filter pockets 2 associated with the pre-drainage system 31. Since the transfer location is situated at one end of the pre-drainage system 31, the conveying direction of the drainage system 1 is preferably opposite to the conveying direction of the drainage system 31 to facilitate a compact construction of one system directly below the other. The reversing gear, shown diagrammatically in FIG. 7, is provided to this end. The driving speed of the filter pockets 27 is identical to the driving speed of the filter pockets in the driven region of their conveying path because to facilitate transfer it is advantageous for the filter pockets 37 to operate in synchronism with the filter pockets 2.

After the filter pockets 2 of the drainage system 1 are filled with pre-drained sludge, they are pushed by the driver 21 over the locking means 14. The drivers 21 move downwardly with the chains over the reversing pulley 12 to the reversing pulley 13 at the moment at which the locking means 14 grip behind a cross-member 7. Since the filter pockets 2 have no drive behind the locking means 14 and since on the other hand the locking means 15 are provided at the end of the non-driven region, there will be a build-up of circulating filter pockets between the locking means 14 and 15 in which build-up zone the said pockets are compressed and occupy less space in the conveying section in accordance with the volumetric reduction of sludge because the roller pairs 5 are able to move towards each other. This means that substantially more time is available for drainage under minimum pressure in the drainage section which substantially represents the horizontal part of the build-up range than would normally correspond to the conveying speed in the driven range in which the filter pockets 2 are coupled by means of drivers 21 to the chains 3.

If it is assumed that the filter pockets 37 of the pre-drainage system 31 have a top opening of 300 mm width, so that the distance between drivers 21 on a chain and accordingly the opening of the filter pockets 2 also amounts to 300 mm and the dimensions are selected so that this opening is reduced to approximately 100 mm in the build-up range, it will be possible for three filter pockets 2 to be accommodated in the same region of the conveying section, this being equivalent to three times the length of time being made available for drainage.

After pre-drainage is completed, one filter pocket 2 at the end of the build-up range is pushed beyond the locking means 15 by the inward pushing of a pocket 2 behind the locking means 14 so that the first-mentioned pocket enters into the path of motion of the drivers 21 which completely re-open the pocket 2 for transfer of the pre-drained sludge and return the pocket upwardly into the transfer zone 36 due to the driver applied by the chain sprockets 8, 9.

It should be recognized that the instant system of continuous filter pockets may be substituted for the continuous filter pocket systems which are used in the aforesaid First Case, and used in combination with the other features which are disclosed in the aforesaid First Case. For example, the treatment with flocculants prior to the continuous filter pocket system pretreatment which is described in the said First Case may be also used for the present invention, the description of the method and apparatus for adding floculants to be sludge upstream of the continuous filter pocket system being incorporated herein by reference. To facilitate a better understanding of the relationship of the filter pocket system of the present invention to the other elements, such as the floculant mixing prior to entry into the continuous filter pocket system, the following discussion of the First Case is made. The drawings of the aforesaid First Case Ser. No. 632,789, FIGS. 1 and 2 in that case, are renumbered herein as FIGS. 1' and 2' and are incorporated herein by reference. Similarly, the reference numerals which follow and are primed refer to the correspondingly unprimed reference numerals of said First Case Ser. No. 632,789.

In the drawing the numeral 1' in each case refers to a sludge metering pump through which the crude sludge for treatment is first applied to a conical mixer 2' in which an agitator 3' is driven by a hollow shaft 4'. A flocculating agent is fed through the hollow shaft 4' into the mixing vessel 2' for mixing with the crude sludge and passes through nozzles 5' at the end of three arms of the hollow shaft 4' into the mixing vessel 2'. The sludge mixed with the flocculating agent rises in the mixing vessel 2' and from there passes into a reaction chamber 6', situated above the mixing vehicle in the illustrated embodiment but can also be provided at another place. The flocculated sludge, mixed with the flocculating agent, passes in the example according to FIG. 1' through a shaft 51' with a horizontal section 52' into pre-de-watering means which take the form of a cell drum 53' in FIG. 1' and are described below. The pre-de-watered sludge passes from the cell drum 53' to the outer belt filter which is designated with the numeral 9' and is associated with a belt screen press. The filter belt 9' initially passes over the pulleys 29' and can be associated with vibrating means which impart controllable vibrations to the filter belt 9'. The vibrating means can be of any desired generally known construction.

At the end of the horizontal travelling section the filter belt 9 is guided downwardly over the left-hand pulley 29 and from that position onwards forms a wedge-shaped feed chamber the bottom of which is defined by a second filter belt 10'. Both filter belts 9' and 10' thus take up between them the sludge fed to the filter belt 9'. The filter belts 9' and 10' are supported from below by means of support rollers 33' and are compressed from above by means of pressure rollers 34' so that water or other liquid is expressed from the sludge on the said horizontal pressure section by virtue of the pressure applied by the filter belts 9', 10'.

The outer filter belt 9 and the inner filter belt 10' are constructed of fine-mesh wire fabric each being supported by an outer backing belt 11' and an inner backing belt 12'. As already mentioned, the backing belts 11' and 12' are constructed so as to absorb maximum compressive stresses. For example, they can comprise warp wires which are woven into steel crossbars.

The numeral 21' refers to a tensioning device for the backing belts 11' and 12' and the numeral 22' refers to a tensioning device for the filter belts 9' and 10'.

After leaving the horizontal pressure section the filter belts 9' and 10' and the backing belts 11' and 12' are guided over a rotatable drum, which is constructed as a rotatable roller cage 13' in the illustrated embodiment and is set in rotation via the drive shaft 17' by the motor 18'. Each of the pressure rollers 14' of the roller cage 13' is spring-biased by adjustable compression springs. The direction of rotation of the roller cage 13' and of the shaft 17' can also be reversed so that the roller cage 13' can be rotated either in the same sense as the belts 9' to 12' or in the opposite sense.

Advantageously, only the backing belts 11' and 12' of all belts are driven, namely by the motors 19' and the driving drums 20', and in the course of their motion they entrain the outer filter belt and the inner filter belt, the last-mentioned belts being therefore not separately driven.

The pressure which is applied to the belts 9' to 12' on the pressure de-watering section is regulated by adjustment of the springs. In all cases it is appropriate to set the compression springs progressively harder in the course of the compression path of the sludge so that the de-watering pressure is increased. Furthermore, it is appropriate for the roller cage 13' of the drums to be driven asynchronously with respect to the speed of the backing belts 11' and 12' or of the outer and inner filter belts 9' and 10' so that the outer stationary pressure rollers 14' penetrate into the gaps between the individual rollers in the course of the rotation of the roller cage 13', thus forcing the sludge and the belts to perform a corrugating motion which ensures opening and intensive working through of the sludge which is to be compressed.

The liquid which is discharged from the sludge during its entire passage through the press is collected by water-collecting and discharge plates 25' disposed below the belts or within the roller cage 13' and it is a characterizing feature of the invention that it provides very good means for the collection and discharge of the said liquid, more particularly by preventing liquid which is already removed from re-entering the sludge 25 is the case in filter presses of a similar kind. The liquid which has been driven out leaves the press via the discharge 31' while the compressed sludge is discharged at 32'.

The numeral 26' refers to filter belt washing nozzles through which the filter belts 9' and 10' are washed through before they are again loaded with sludge.

As can be seen by reference to the drawing, the filter belts 9' and 10' rise around the roller cage 13' in the last quarter of the working section. This ensures that the expressed liquid is also able to run off downwardly on this partial section.

The cell drum 53', illustrated in FIG. 1', is driven in the clockwise direction by means of a shaft 54'. The shaft 54' is surrounded by a hollow shaft 55' on which the cell walls 56 are mounted. The cells between the cell walls 56' are provided with screen pockets 57' which form a wedge-shaped cross-section, comprise screens or screen belts with screen perforations larger than those of the filter belts 9' and 10' and whose side walls can also be axially defined by the same screen material. In the drawing these screens are designated with the numeral 58'.

The effective axial length of the screening drum corresponds to the width of the filter belts 9' and 10' and the screening drum is driven by a separate motor 65' at variable speed. In its entirety the said screening drum is disposed in an enclosed casing 49' and is covered on the right-hand side by a covering 60' which can also be constructed as a screen.

The flocculated sludge rises from the settling tank 6' of the flocculating system through the shaft 51' and passes via the horizontal section 52' of the shaft to its discharge port which corresponds approximately to the width of the cell drum 53', into the screen pocket situated at the top and the greater part of the water contained in the sludge is withdrawn and passes through the screens 58' into the cavity between the shaft 54' and the hollow shaft 55' for lateral extraction in the axial direction. The individual screen pockets are separated from each other by the cell walls 56' so that the water discharged from one screen pocket cannot pass into the adjacent screen pocket. The de-watering operation continues in the course of rotation of the screen drum in the clockwise direction until the sludge contained in the individual screen pockets is fed to the filter belt 9' near the bottom apex of the screen drum and is then subsequently de-watered in the conventional manner in the belt screen press.

The embodiment of the invention according to FIG. 2' in which the de-watering device is constructed as a screen pocket filter is recommended if larger filter throughputs or higher degrees of dryness are required in the final sludge.

In the belt pocket filter a circulating conveyor belt 61' is provided with screen pockets 62' in the manner of the screen pockets 57' and has walls of screen material 63', the two ends being guided or driven around cell wheels 64'. The motor is designated with the numeral 65'.

As in the embodiment according to FIG. 1', the flocculated sludge rises from the settling tank 6' in a shaft 51' to the top and is there fed via a horizontal section 52' of the shaft through the discharge post 66' thereof into the individual pockets of the belt pocket filter for de-watering, the upper stringer of the belt moving from left to right. The water discharged from the individual filter pockets is collected by the collecting plate 67' and is laterally discharged. The de-watered sludge is delivered on to the filter belt 9' at the bottom apex of the right-hand driving wheel 64'.

The left-hand reversing drum of the belt pocket filter need not be constructed as a cell drum in the same way as the right-hand drum, but may be constructed in the manner of a cage whose bars engage between the individual filter pockets when the belt is reversed. The numeral 68' refers to a spraying device disposed in the region of the left-hand reversing drum and is intended for washing out the screen walls of the filter pockets. The belt pocket filter according to FIG. 2' is appropriately surrounded by an enclosed casing 69' in the same way as the cell wheel in FIG. 1'.

The screen walls of the filter pockets in the belt pocket filters also have screen perforations which are coarser than those corresponding to the mesh size of the filter belts 9' and 10'. The conveying rate of the belt pocket filter according to FIG. 2' can be regulated as desired in the sense already explained in order to achieve adaptation to the prevailing conditions.

For example, if it is assumed that a sludge containing 4% of dry substance is to be processed at the rate of 10 m³/h it means that the feed rate is unpressurized belt de-watering is 10 m³/h with a dryness fraction of 4%. A dry substance content of approximately 15% with the discharge of 7.35 m³ of water can be achieved in pocket de-watering. At the delivery point of the pocket de-watering system and therefore the feed location for belt screen de-watering the sludge rate is therefore only 2.65 m³/h with a dryness fraction of 15%. Accordingly, the belt screen press can be operated within specific limits with selectable speeds lower than those of the pocket de-watering system so that the time during which pressure acts on the prede-watered sludge and the de-watering time itself can be suitably dimensioned depending on the required final dry substance content. Tests have shown that 30 to 40% of dry substance can be achieved in the final sludge depending on the kind thereof.

It should also be noted that the invention of the present case may be used in the combination of steps for improved sludge treatment disclosed in my copending application, U.S. Ser. No. 632,788, "IMPROVED VARIABLE UNIT PREWATERING TREATMENT WITH CONSECUTIVE INDEPENDENT STAGES," filed on even date herewith.

What is claimed is:

1. An apparatus for the removal of an appreciable amount of liquid from an aqueous mixture having an appreciable solids content, which comprises a system of continuous filter pocket means, said filter pocket means being positioned to travel in an endless pattern whereby at one position said mixture enters into individual filter pocket means and at a second position said filter pocket means discharges the partially dewatered aqueous mixture out of said apparatus, each said filter pocket means having an open top, sidewalls and a closed bottom, said sidewalls and bottom comprising perforated material for the drainage of liquid therethrough, means for delivering an aqueous mixture of material into the open tops of said pocket means when those tops face upwardly, means for discharging an aqueous mixture of material from the open tops of said pocket means when those tops face downwardly, said apparatus further comprising means to compress the pocket means to reduce the volume thereof after delivery of material thereinto and prior to discharge of material therefrom.

2. In an apparatus for removing the water content of sludge whereby there is produced a dried sludge residue, said apparatus comprising a filter press, the improvement comprising positioning upstream of said filter press a device for partially dewatering said sludge, said device comprising continuous filter pockets positioned in relationship to said filter press whereby said sludge enters into individual filter pockets which discharge onto a horizontal belt of the filter press, each of said filter pockets having an open top, sidewalls and a closed bottom, said sidewalls and bottom being constructed of a material to permit the passage of water therethrough while retaining the solids content of said sludge, means for delivering sludge into the open tops of said pocket means when those tops face upwardly, said filter pockets being a part of an endless system whereby each filter pocket passes through a stage where said sludge loses an appreciable amount of water content through drainage and before said material leaves said filter pockets when the tops face downwardly by the action of gravity, said device of continuous filter pockets being spatially related to said filter press in a manner that said stage is above a horizontal belt section of said filter press, and means to compress the pockets to reduce the volume thereof after delivery of sludge thereinto and prior to discharge of sludge therefrom.

3. The apparatus of claim 2, wherein said filter pockets are constructed as pockets which can be compressed in the circulating direction in the course of their circulation.

4. An apparatus of claim 3, wherein the compressible filter pockets are disposed in an endless circulating conveyor.

5. An apparatus of claim 4, wherein the filter pockets can be coupled to the circulating conveyor by means of detachable couplings.

6. An apparatus of claim 5 wherein the couplings associated with the filter pockets are detachable over part of the circulating path of the circulating conveyor.

7. An apparatus of claim 3, wherein the circulating filter pockets are supported so as to circulate freely in a circulating path.

8. An apparatus of claim 4 wherein the filter pockets are connected to the drive of the circulating conveyor by means of couplings between the point at which the sludge is discharged and the point at which the sludge is delivered into the filter pockets, and that one least one device is provided in the circulating path in order to produce a build-up which reduces the width of the individual filter pocket and is situated in the circulating path upstream of the discharge position.

* * * * *